Patented Nov. 10, 1953

2,658,838

UNITED STATES PATENT OFFICE 2,658,838

METHOD OF COATING MINERAL GRANULES

Paul Teetor, Somerville, Clinton Grove, Basking Ridge, and Charles W. Heller, Bound Brook, N. J., assignors to Central Commercial Company, Chicago, Ill., a corporation of Illinois No Drawing. Application November 1, 1948, Serial No. 57,838

7 Claims. (Cl. 117—100)

This invention relates to granular surfacing material and more particularly to coated mineral granules for use as a protective surfacing for prepared roofing, siding and shingles of the character employing a fibrous foundation sheet saturated with a low melting point bitumen and provided with a high melting point bituminous coating in which the coated granules are secured.

An object of the invention is the provision of a new and improved process for coating granular material such as buff burning or white burning raw clay of sufficient hardness, which said clay is crushed to granule size and dried to prevent adhesion of dust to the granules, then treated to eliminate dust therefrom and finally attaching to the granules, cleaned as aforementioned, an opaque weather resisting glaze coat.

A further object is the production of granules from a buff burning or white burning clay and treatment thereof to insure production of glaze coated granules ranging from a substantially pure white to a wide variety of colors such as blue granules produced by pigmentation with cobalt blue, or green granules by pigmentation with chromic oxide, or red granules by pigmentation with iron oxide. In certain of these examples it is not necessary to clean the granules since dust adhering to them in the crushing process will have not detrimental effect on the color desired.

A further object of the invention is the production of a satisfactory white granule at a reasonable cost. In the instant case, the clay base provides a sufficiently light color so that an excessively high pigmentation of the color coating is not necessary. In this connection, we point to the fact that if rock were employed, it would, if dark, require excessive pigmentation in order to produce a satisfactory color, and if light, would probably require excessive pigmentation to produce opacity since light rocks are ordinarily transparent or translucent, permitting unwanted passage of ultra-violet light rays through the granules, causing the asphalt in which the granules are embedded to lose its adhesiveness with resultant dropping out of the granules after a period of exposure.

A still further object is the production on the surface of the granules, of a color coating consisting of the reaction product of sodium silicate and china clay or other white burning clay fused or sintered into a continuous film enveloping each individual granule.

A further object is the provision of a coating of a pleasing neutral white color, accomplished by the introduction into the formula of a blueing agent to overcome the otherwise creamy white color resulting from the firing of the so-called white burning clay. Among the most satisfactory blueing agents are cobalt compounds, of which cobalt sulfate, $CoSO_4.7H_2O$, is very suitable from the standpoints of convenience of use and of economics.

Another object is the provision of a granule, the base material of which is sufficiently soft to permit easy cutting of the roofing or siding sheet to which it is applied, thereby preventing undue wear of the customary cutting tool.

A still further object is the provision of a process for coating surfacing granules which insures elimination of the necessity for using expensive, and at times, scare pigments such as titanium dioxide or other opaque whites.

A still further object is the provision of a process enabling satisfactory application of a glazed or fused coating to mineral granules by a single operation.

In carrying the invention into practice, a buff or white burning raw clay of sufficient hardness is crushed to granule size in the usual manner familiar to persons skilled in the art. The granules are then dried to prevent adhesion of dust, then treated to remove the dust and thereby leave the granules in a clean state. Removal of dust from the granules can be accomplished either by means of a cleaning flume where the dust is blown away by a strong current of air or by screening since the buff colored dust, if not removed, would contaminate and result in production of a coating of cream or buff color instead of the desired white. Instead of crushing and then drying the clay as above set forth, drying can be effected before the crushing operation.

A coating consisting of a mixture of sodium silicate (preferably with a soda to silica ratio of 1 to 2.85) with a white burning clay, sufficient water to produce the necessary fluidity and sufficient of a cobalt compound to give a blueing action sufficient to overcome the natural cream color of the clay, is prepared in a tank provided with suitable agitation and is applied to the granules in a suitable mixer. This mixer may be one of a number of different types; the one which we have employed with good results being of the intermittent type consisting of a tub in which there is an agitator operating on a centrally located shaft. The granules are poured into the tub and the requisite amount of coating added, after which the two are mixed until satisfactory distribution of the coating on the surface is obtained.

The granules are then dumped into an elevator which conveys them to the intake of a furnace or kiln. The furnace is operated in such a manner as to dry the granules as quickly as possible and then to burn out of the clay, all carbon, sulphur and other combustible and volatile materials and to obtain the maximum temperature at such a point in the furnace that the granules may remain at the maximum temperature for approximately 15 minutes before being discharged from the furnace. If the granules contain appreciable amounts of carbon and/or sulphur and it is desired to remove these entirely, it will be necessary to maintain in the kiln a highly oxidizing atmosphere.

To each ton of granules add the following, that have been mixed together with the granules so as to completely form on each individual granule a thin film of coating material:

| | |
|---|---|
| Sodium silicate (ratio 1 to 2.85) | 90 |
| H₂O | 90 |
| China clay | 150 |
| CoSO₄.7H₂O | 1.8 |

Experiments indicate that at temperatures of 1800° F. there is a definite partial fusion of a film formed from the coating described above. The white burning clay is used in such excess of that required to react with the sodium silicate that a substantial portion of the clay remains as a white opaque pigment. Thin films have been prepared and have been fired at 1800° F. and then examined with a microscope and a definite glaze can be observed.

While we prefer to use sodium silicate as the binder or the reactant with the clay to form the fused or fritted film, other fluxing materials such for example as borax, boric acid, phosphates, phosphoric acid, soluble silicates other than sodium silicate, calcium fluoride, sodium fluosilicate and so forth. These fluxing materials may also be used singly or in combination. The use of these materials makes it possible to operate at temperatures from 1500° F. to 2000° F. without sacrificing any of the advantages of the invention as herein set forth.

By pigmentation with pigments which will withstand the temperatures used in this process, it of course, is possible to produce coatings of any desired color, as, for instance, the production of a green by pigmentation with chromium oxide. Other materials may be used for other colors. In some of these cases, it would not be necessary to clean the granules since the dust adhering to the granules would have no detrimental effect on the color desired.

While we prefer to use clay as a base granule material, feldspar, quartz or other harder and less opaque base materials have been found to produce merchantable granules. Some of the advantages which we attribute to our use of clay are lost, however.

We stress the novel features of our invention such as (1) the feature consisting broadly in the disclosed use of a base granule material of clay having a coating consisting of the reaction product of sodium silicate and white burning clay fused or sintered into a continuous opaque film enveloping each separate granule, the white burning clay being used in such excess of that required to react with the sodium silicate that a substantial portion of the clay remains as a white opaque pigment; (2) the feature which comprises forming a fused opaque coating on clay granules by a single operation and without use of frits; (3) the feature which consists in our use of cobalt compounds for producing a blue material that overcomes the natural creamy white color of the burned white burning clay; (4) the feature consisting in coloring granules by heating the granules at sufficient temperature to stabilize the coated granule against disintegration by weathering, as distinguished from prior methods wherein at similar temperatures coatings pigmented with titanium dioxide become yellow; (5) the feature which consists in crushing raw clay and screening same to size, then drying the granules and subsequently dedusting them by means of a cleaning flume or by screening to prevent contamination of the color coating with the buff burning clay dust when manufacturing neutral white granules as distinguished from buff or other colored granules; (6) the feature which consists in applying the coating to the granules by means of a mixer and then charging same into a furnace or kiln which is operated under such conditions of temperature and atmosphere as to burn out substantially all of the carbon and sulphur and stabilize the granules against weathering; (7) the feature which consists in maintaining such temperature as will avoid discoloration of the color coating; (8) the feature which consists in the production of suitable white mineral granules, each characterized by a base material such as clay, feldspar, pyrophyllite, etc. coated in the manner aforementioned to provide on each individual granule an insoluble, non-blooming opaque coating which is the reaction product of china clay with sodium silicate or other flux or fluxes fused on the surface of the granule; (9) the feature which consists in the production of colored mineral granules, each characterized by a suitable base material such as clay, feldspar, pyrophyllite, slag and numerous common rocks, coated in a manner similar to aforementioned but including a suitable coloring pigment to provide on each individual granule an insoluble, non-blooming opaque coating which is the reaction product of a suitable clay with sodium silicate or other flux or fluxes fused on the surface of the granule; (10) the feature which consists in forming on the granule a non-blooming and water insoluble fused opaque coating consisting of the reaction product of a white burning clay, sodium silicate or other fluxes and a blueing agent such as cobalt sulphate.

While we stress use of buff burning clays commonly known as brick clays, the gist of the invention resides in our use of a clay (whether buff burning or white burning) which will burn hard at a temperature insufficient to melt the clay but sufficient to convert the coating into an insoluble glaze and fix the color, which said coating consists of a white burning clay, sodium silicate or other fluxes and a blueing material when producing neutral white granules or other well known pigmenting materials when producing granules of the various colors, such as red, blue, green, etc. Kaolin, ball clay, other white burning clays or various buff burning brick claps can be satisfactorily employed for the broad purpose of our invention.

What we claim as our invention is:

1. The herein described method of producing neutral white, weather-resistant mineral surfacing granules which consists in crushing buff burning clay to desired granule size, coating the individual granules with an aqueous mixture comprising a flux whose fusion point is above 1500° F., and a white burning clay, the amount of said white burning clay being in excess of that required to react with the flux and sufficient to cause a substantial portion thereof to remain on the granules as a white pigment, rapidly heating the granules at temperatures of from 1500° F. to 2000° F. to eliminate from the clay substantially all combustible and volatile materials and finally retaining the granules at the maximum of the aforestated temperatures for a period of time sufficient to cause insolubilization of said flux and to fuse the coating on the surfaces of the individual granules.

2. The herein described method of producing neutral white, weather-resistant mineral surfacing granules which consists in coating individual granules of clay with an aqueous mixture comprising a flux whose fusion point is above 1500° F., and a white burning clay, the amount of said white burning clay being in excess of that required to react with the flux and sufficient to cause a substantial portion thereof to remain on the granules as a white pigment, rapidly heating the granules at temperatures of from 1500° F. to 2000° F. to eliminate from the clay substantially all combustible and volatile materials and finally retaining the granules at the maximum of the aforestated temperatures for a period of time sufficient to fuse the coating on the surfaces of the individual granules.

3. The herein described method of producing neutral white, weather-resistant surfacing granules which consists in coating the individual granules with an aqueous mixture comprising a flux whose fusion point is above 1500° F., and a white burning clay, the amount of said white burning clay being in excess of that required to to react with the flux and sufficient to cause a substantial portion thereof to remain on the granules as a white pigment, rapidly heating the granules at temperatures of from 1500° F. to 2000° F. to eliminate from the clay substantially all combustible and volatile materials and finally retaining the granules at the maximum of the aforestated temperatures for a period of time sufficient to insolubilize the flux and fuse the coating on the surfaces of the individual granules.

4. The herein described method of producing neutral white, weather-resistant surfacing granules which consists in coating the individual granules with an aqueous mixture comprising silicate of soda and a white burning clay, the amount of said white burning clay being in excess of that required to react with the silicate of soda and sufficient to cause a substantial portion thereof to remain on the granules as a white pigment, rapidly heating the granules at temperatures of from 1500° F. to 2000° F. to eliminate from the clay substantially all combustible and volatile materials and finally retaining the granules at the maximum of the aforementioned temperatures for a period of time sufficient to substantially completely insolubilize the silicate and fuse the coating on the surfaces of the individual granules.

5. The herein described method of producing substantially neutral white mineral surfacing granules from base granular material of clay, which consists in coating the individual granules with an aqueous mixture comprising silicate of soda and a white burning clay, the amount of said white burning clay being in excess of that required to react with the silicate of soda and sufficient to cause a substantial portion thereof to remain on the granules as a white pigment, rapidly drying the granules at temperatures of from 1500° F. to 2000° F. to eliminate from the clay substantially all combustible and volatile materials and finally retaining the granules at the maximum of the aforementioned temperatures to substantially completely insolubilize the flux and fuse the coating on the surfaces of the individual granules.

6. The herein described method of producing mineral surfacing granules which consists in crushing buff burning clay to desired granule size, cleaning the granules to eliminate free surface dust therefrom, coating the individual granules with a mixture comprising a flux whose fusion point is above 1500° F., and a white burning clay, the amount of said white burning clay being in excess of that required to react with the flux and sufficient to cause a substantial portion thereof to remain on the granules as a white pigment, and rapidly heating the granules to from 1500° F. to 2000° F. and retaining the granules at the maximum of the aforestated temperatures for a predetermined period of time necessary to fuse the coating on the surface of the individual granules.

7. The herein described method of producing weather-resistant color-coatings on mineral surfacing granules which consists in coating the granules with an aqueous mixture comprising silicate of soda, a white burning clay and coloring pigment, the amount of said white burning clay being in excess of that required to react with the silicate of soda and sufficient to cause a substantial portion thereof to remain on the granules as an opaque coating, rapidly heating the granules to temperatures of from 1500° F. to 2000° F. to eliminate from the clay substantially all combustible and volatile materials and finally retaining the granules at a temperature above 1800° F. but not above 2000° F. for a period of time sufficient to substantially completely insolubilize the silicate and fuse the coating into an insoluble glaze and thereby permanently attach the coloring pigment to the surfaces of the granules.

PAUL TEETOR.
CLINTON GROVE.
CHARLES W. HELLER.

References Cited in the file of this patent
UNITED STATES PATENTS

| Number | Name | Date |
|---|---|---|
| 2,001,448 | Beasley | May 14, 1935 |
| 2,378,927 | Jewett | June 26, 1945 |
| 2,379,358 | Jewett | June 26, 1945 |
| 2,422,927 | Reynolds | June 24, 1947 |